W. J. GROTENHUIS.
AUTOMOBILE BUMPER.
APPLICATION FILED AUG. 24, 1921.
1,413,221.  Patented Apr. 18, 1922.
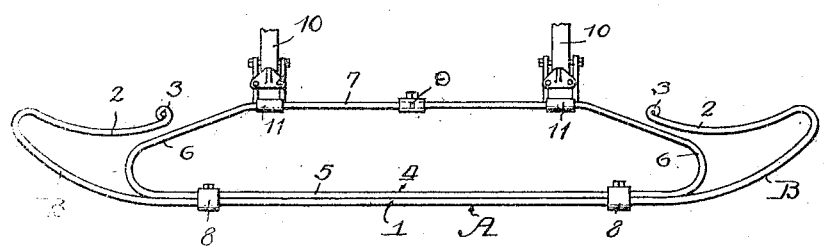
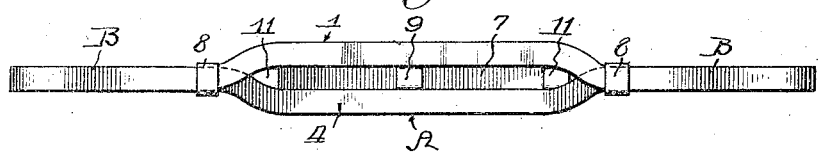
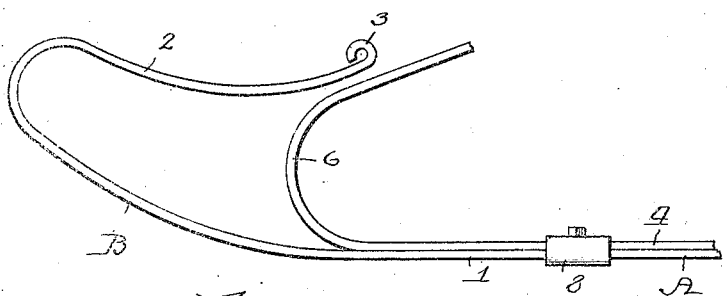
Inventor,
William J. Grotenhuis,
By Offield Towle & Linthicum Attys.

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF ILLINOIS.

AUTOMOBILE BUMPER.

1,413,221.   Specification of Letters Patent.   Patented Apr. 18, 1922.

Application filed August 24, 1921. Serial No. 495,020.

*To all whom it may concern:*

Be it known that I, WILLIAM J. GROTENHUIS, a citizen of the United States, and a resident of Chicago, in the county of Cook and State of Illinois, have invented certain new and useful Improvements in Automobile Bumpers, of which the following is a specification.

This invention relates to improvements in automobile bumpers and more particularly to bumpers of the so-called resilient bar type wherein the resistance to impact is afforded by the elastic or resilient qualities inherent in the structure.

The general features of construction of a bumper to which the present invention refers is revealed in a prior application filed by William G. Pancoast and myself jointly in the United States Patent Office on June 13th, 1919, and bearing Serial No. 303,919, now Patent #1,374,893, granted April 12, 1921, and the purpose of the present invention is to provide a construction for a bumper having the same general characteristics and functions but departing therefrom in the mode of construction and assembly of the resilient bars constituting the bumper structure.

The features embodying the invention are clearly illustrated in the accompanying drawings, in which—

Fig. 1 is a top plan view of a bumper as attached to the front of a vehicle frame, Fig. 2 is a view in front elevation of the bumper, and Fig. 3 is an enlarged top plan view of one end of the bumper.

As hereinbefore suggested, the complete structure is made up of resilient bars bent to desired shape and connected together to form the completed structure, these bars being preferably of the comparatively flat type and arranged so that they are yieldable in a horizontal direction and non-yieldable in a vertical direction.

Referring to the bumper irrespective of its component parts, the same is composed of a central impact section A made up of two vertically spaced bars, as clearly shown in Fig. 2, thus forming a wide impact area, said central impact section being located between outwardly extending end sections B, B, these being formed of single bars.

The manner in which the bumper is constructed will be more clearly understood from the following: A single bar 1 extends throughout the length of the bumper and forms the upper portion of the central impact section A as well as the end sections B, B, this bar having an upwardly offset portion throughout its central part and having its end portions curved rearwardly and terminating in U-shaped extremities, formed by bending the ends 2, 2 of the bar 1 rearwardly and inwardly the extreme ends of the bar being entirely free and preferably blunted by rolling the ends of the bar backwardly upon itself, as shown at 3, in Figs. 1 and 3. This it is seen that the bar 1 forms the upper half of the central impact section A, the end sections B, B of the bumper and the rearwardly disposed free ends 2, 2. Connected with the bar 1 and forming the remaining part of the bumper structure is a second bar 4 having a radically different shape, namely, that of a complete loop, a front portion 5 which extends throughout the central impact section A, end portions 6, 6 which are bent rearwardly and inwardly, and a straight rear portion 7 parallel with the front section 5 which is spaced immediately behind the central impact section A. The central portion of the front section 5ᵃ of the bar 4 is vertically offset in a downward direction and forms with the vertically offset portion of the bar 1 the wide impact area of said central section, these offset portions converging toward their ends and unite in overlapping and flatwise contact just beyond the extremities of said central impact area. At these points collars 8, 8 surround the bars 1 and 4 forming a permanent connection therebetween. Immediately beyond the collars 8, 8 the bar 4 which is immediately behind the bar 1 is bent rearwardly in substantially semi-circular form, thus forming the end sections 6, 6. The rearmost parts of the end portions 6, 6 are straightened and extend obliquely in an inward and rearward direction to meet the rear portion 7, 7 at points just outwardly from the points of attachment of the bumper structure to the vehicle frame, said oblique portions being spaced a short distance from the extremities 3, 3 of the end portions 2, 2 of the front bar 1. As a preferred arrangement, the bar 4 is bent so that the ends thereof meet in abutting relation centrally of the rear bar 7, these ends being clamped or secured together by means of a collar 9, thus making the bar 4 a virtually continuous loop.

As before suggested, the structure thus described is attached to the vehicle frame by a direct connection between the bar 4 and the longitudinal frame members or sills 10, 10 of the vehicle through the medium of attaching brackets 11, 11 which are secured to the ends of the frame members 10, 10 and have clamping engagement with the rear portion 7 of the bar 4 immediately adjacent the ends thereof and just inwardly from the points where the bar 4 is bent forwardly to form the end portion 6, 6.

Having described in detail the construction of the bumper, it is at once manifest that it can be divided into at least two component parts so far as the shock or impact absorbing function is concerned. In the first place, we find the central impact section located immediately in front of the more vital portions of the vehicle and its wide impact area made up of the offset portions of the bars 1 and 4 which are securely clamped together immediately beyond the impact section A, thus forming a complete unit. Immediately beyond the ends of the central impact section A we find the curved end portions 6, 6 of the bar 4 extending directly to the brackets 11, 11 constituting the points of support of the bumper structure. Thus shocks received by the central impact area are absorbed or resisted by the flexing of the end portions 6, 6 of the bar 4 as well as the resistance afforded by the counter flexing of the rear bar 7. For all intents and purposes, therefore, blows received by the central impact section A are resisted entirely by members which extend only throughout the central portion of the bumper, that is to say, a structure which is considerably shorter than the complete bumper structure, and hence less yieldable and resilient, and therefore having greater capacity to withstand shocks thus delivered without distorting the structure to the point of rupture. The other component part of the bumper is necessarily the end sections B, B which extend outwardly beyond the unitary structure forming the central part of the bumper, these end sections being substantially free and capable of resisting impacts, first, by virtue of their inherent resiliency, and secondly, by transmitting the shock to the bar 4 and ultimately to the frame members 10, 10. To illustrate, if a glancing blow is received by one of the end sections, a part of the force of such blow will be absorbed by a bending of the end section in a rearward direction which undoubtedly would cause the extremity 3 to be brought in contact with the adjacent portion of the bar 4 preventing further distortion of the end portion 2 but at the same time transmitting the remainder of the force to said bar 4 and on either side of the semi-circular end portion 6 of said bar 4, such force to be ultimately absorbed by the resilience or flexing of the adjacent portion of the bar 4.

In this manner it is seen that a bumper structure of this character provides a more rigid structure throughout the central portion thereof, thereby affording a greater degree of protection for the vital parts of the vehicle, such as the radiator and lamps, and at the same time providing ample protection against blows received at the ends of the bumper, without transmitting the shock directly to the vehicle frame but rather through the more rigid central portion which serves to absorb and resist the greater part of the force of such blow, to the end that a small part of the force is ultimately transmitted to the vehicle frame.

Having described the preferred construction of the bumper and the results sought to be obtained thereby, I claim as my invention:

1. In a bumper, the combination of bars extending longitudinally throughout the central portion of the bumper, one of said bars being extended outwardly forming free end sections, and the other of said bars bent rearwardly and inwardly beyond said central portion and adapted for attachment to a vehicle.

2. In a bumper, the combination of an impact member comprising a plurality of bars extending longitudinally throughout the central portion of the bumper, one of said bars being extended laterally to form free end sections, and the other of said bars being bent rearwardly and inwardly and forming a rearwardly disposed portion adapted for attachment to the vehicle.

3. In a bumper, the combination of a plurality of connected bars, one of said bars terminating in free end portions, and the other extending longitudinally throughout a portion of said first mentioned bar intermediate the free end portions thereof, and having its end portions bent rearwardly and adapted for attachment to a vehicle.

4. In a bumper, the combination of an impact section comprising a bar having laterally extended end portions bent rearwardly to form U-shaped free end sections, and a bar having a portion extending throughout the central portion of said first mentioned bar and having its end portions bent rearwardly and inwardly and adapted for attachment to the frame of a vehicle.

5. In a bumper, the combination of an impact section comprising bars extending longitudinally and in vertically spaced relation throughout the central portion thereof, clamping members connecting said bars adjacent the ends of said central portions, one of said bars terminating in free end sections, and the other bar having its end portions bent rearwardly and inwardly to the rear of said impact section.

6. In a bumper, the combination of a central impact section comprising connected bars mounted with vertically offset portions extending throughout said impact section, one of said bars being extended to form free end sections of U-shape, the other bar being bent rearwardly immediately beyond said central impact section and inwardly and in parallel relation therewith.

7. In a bumper, the combination of a central impact section comprising bars spaced apart vertically to form an impact area of increased width, the ends of one of said bars being extended laterally to form end sections, and the end portions of the other bar being bent rearwardly for attachment to the frame of a vehicle.

8. In a bumper, the combination of a central impact section comprising bars connected in overlapping contact at the ends of said central impact section and provided with vertically offset portions therebetween, one of said bars being extended laterally to form free end sections, and the other of said bars being bent rearwardly and inwardly adjacent the ends of said central impact section and its ends meeting in abutting relation rearwardly thereof.

9. In a bumper, the combination of an impact member comprising bars connected together in vertically spaced relation throughout the central section thereof, one of said bars being extended to form free end sections, the other of said bars being bent rearwardly from said central section and inwardly from said end sections, forming rearwardly spaced members, adapted for attachment to a vehicle.

10. In a bumper, the combination of a plurality of resilient bars connected in flatwise contact throughout portions intermediate the ends thereof, one of said bars being extended to form free end sections, and the other bar being bent rearwardly and inwardly and adapted for attachment to a vehicle, said portions of the bars intermediate the ends being offset vertically to provide an impact area of increased width.

11. In a bumper, the combination of an impact section comprising resilient bars extending throughout the length thereof in vertically spaced relation, one of said bars being extended therebeyond and terminating in free end sections, the other of said bars being bent rearwardly and inwardly to the rear of said central impact section, and forming a rearwardly spaced bar adapted for attachment to the frame of a vehicle.

12. In a bumper, the combination of a plurality of resilient bars clamped in flatwise contact at points including an impact section comprising portions of said bars spaced apart vertically, one of said bars being extended to form free end sections, and the other bar being bent rearwardly and inwardly, and its ends joined in abutting relation, and means for attaching the rearward spaced portion of said last mentioned bar to the frame of a vehicle.

13. In a bumper, the combination of a central impact section comprising resilient bars connected together in vertically offset relation, one of said bars being extended beyond said said central impact section and terminating in U-shaped free end sections, the other of said bars being bent rearwardly and inwardly immediately behind said impact section and between said free end sections.

In witness whereof, I hereunto subscribe my name this 18th day of August, A. D., 1921.

WILLIAM J. GROTENHUIS.